United States Patent
Brevick et al.

(10) Patent No.: US 10,001,175 B2
(45) Date of Patent: Jun. 19, 2018

(54) TRANSMISSION OUTPUT SHAFT

(71) Applicant: Ford Global Technologies, LLC, Dearborn, MI (US)

(72) Inventors: John Edward Brevick, Livonia, MI (US); Yuji Fujii, Ann Arbor, MI (US); Gregory Michael Pietron, Canton, MI (US); Gregory Daniel Goleski, Rochester Hills, MI (US); Jeffrey Edward Maurer, Commerce, MI (US); Mark Edward Urbaniak, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 290 days.

(21) Appl. No.: 14/924,275

(22) Filed: Oct. 27, 2015

(65) Prior Publication Data

US 2017/0114834 A1  Apr. 27, 2017

(51) Int. Cl.

| F16D 1/06 | (2006.01) |
| F16D 1/068 | (2006.01) |
| F16D 1/08 | (2006.01) |
| F16D 1/092 | (2006.01) |
| F16H 57/00 | (2012.01) |
| F16H 57/08 | (2006.01) |
| F16H 63/34 | (2006.01) |
| F16H 61/02 | (2006.01) |
| F16H 59/14 | (2006.01) |

(52) U.S. Cl.
CPC ............ *F16D 1/06* (2013.01); *F16D 1/068* (2013.01); *F16D 1/0858* (2013.01); *F16D 1/092* (2013.01); *F16H 57/0025* (2013.01); *F16H 57/082* (2013.01); *F16H 61/0265* (2013.01); *F16H 63/3425* (2013.01); *F16D 1/0876* (2013.01); *F16D 1/0894* (2013.01); *F16H 2059/148* (2013.01)

(58) Field of Classification Search
None
See application file for complete search history.

(56) References Cited

U.S. PATENT DOCUMENTS

| 3,678,784 A | * | 7/1972 | Lemieux | ................ | F16H 3/666 |
| | | | | | 475/276 |
| 6,419,068 B1 | * | 7/2002 | Stephan | .................. | B60T 1/005 |
| | | | | | 192/219.5 |
| 6,581,480 B1 | | 6/2003 | May et al. | | |
| 6,846,260 B2 | | 1/2005 | Horiuchi | | |
| 7,963,179 B2 | | 6/2011 | Schmitz | | |
| 8,672,800 B2 | * | 3/2014 | Nomura | ................ | F16H 57/082 |
| | | | | | 475/331 |
| 8,844,379 B2 | | 9/2014 | Pietron et al. | | |
| 2004/0020321 A1 | * | 2/2004 | Whitebread | .......... | F16D 1/0894 |
| | | | | | 74/473.21 |

(Continued)

*Primary Examiner* — Jacob S. Scott
(74) *Attorney, Agent, or Firm* — James Dottavio; Brooks Kushman P.C.

(57) ABSTRACT

A transmission includes a case, a torque sensor, and a two-piece output shaft. The torque sensor is attached to the case and defines an inner diameter. The two-piece output shaft assembly is partially disposed within the case and includes a planet carrier operably coupled to a shaft extending through the inner diameter. The carrier and the shaft are separate components that are directly connected together and the carrier defines a park gear.

9 Claims, 5 Drawing Sheets

(56) References Cited

U.S. PATENT DOCUMENTS

| | | | |
|---|---|---|---|
| 2005/0204830 A1 | 9/2005 | Kuroda et al. | |
| 2008/0028612 A1* | 2/2008 | Shirokoshi | F16D 1/072 29/893.1 |
| 2010/0304918 A1* | 12/2010 | Burgman | F16H 57/082 475/331 |
| 2012/0099926 A1* | 4/2012 | Lissy | F16D 1/0876 403/356 |
| 2014/0230570 A1* | 8/2014 | Kapas | G01L 3/101 73/862.193 |
| 2014/0318272 A1* | 10/2014 | Pietron | G01L 3/103 73/862.335 |

\* cited by examiner

TRANSMISSION OUTPUT SHAFT

TECHNICAL FIELD

The present disclosure relates to transmissions for motor vehicles and more specifically to an output shaft of the transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. The transmission speed ratio is the ratio of input shaft speed to output shaft speed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Most transmission are equipped with a torque converter or other type of launch device. When the vehicle is stationary or moving very slowly, the gearbox input speed is less than the minimum operating speed of the engine. A launch device transmits torque from the engine to the gearbox input while permitting the engine to rotate at an acceptable speed. A torque converter includes an impeller driven by the engine and a turbine driving the gearbox input. Torque is transferred from the impeller to the turbine hydro-dynamically.

SUMMARY

According to one embodiment, a transmission includes a case, a torque sensor, and a two-piece output shaft. The torque sensor is attached to the case and defines an inner diameter. The two-piece output shaft assembly is partially disposed within the case and includes a planet carrier operably coupled to a shaft extending through the inner diameter. The carrier and the shaft are separate components that are directly connected together and the carrier defines a park gear.

According to another embodiment, a transmission two-piece output shaft assembly includes a planet carrier defining an inner bore and a park gear, and a shaft having a fixed end disposed within the bore and a free end coupleable with a driveline component. The carrier is a first material and the shaft is a second material that is different than the first.

According to yet another embodiment, a method of assembling a transmission includes providing a transmission case, and providing a planet carrier that defines a inner bore and a park gear. The method also includes inserting a first end of an output shaft of the transmission into the inner bore to create a two-piece output shaft, and installing the two-piece output shaft in the case. The method further includes receiving the shaft through an inner diameter defined by a torque sensor that is connected to the transmission.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
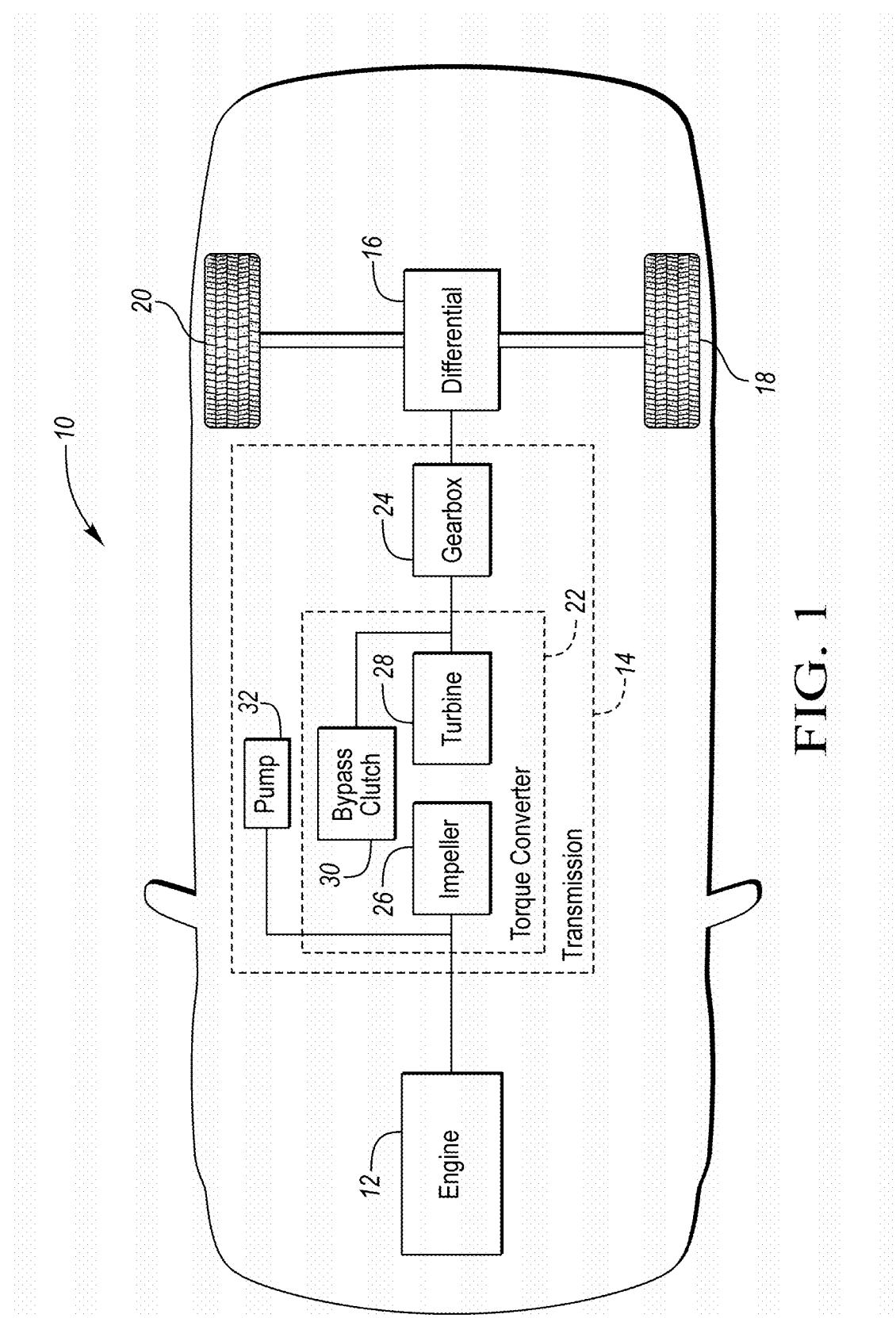
FIG. 1 is a schematic diagram of an example vehicle.

An exemplary vehicle powertrain 10 is illustrated schematically in FIG. 1. In FIG. 1, solid lines represent mechanical connections such as shafts or fixed ratio gearing. The engine 12 generates mechanical power by burning fuel. The transmission 14 transmits the power to a differential 16 at a shaft speed suited to current vehicle needs, which may be faster or slower than the shaft speed at which the engine 12 generates the power. The differential 16 reduces the shaft speed by a fixed final-drive ratio and transmits the power to the left and right driving wheels 18 and 20, allowing for slight speed differences between the wheels as the vehicle turns a corner.

The transmission 14 may include a torque converter 22, or other launch device, and a gearbox 24. The torque converter 22 includes an impeller 26 that is fixed to the engine crankshaft and a turbine 28 that is fixed to the gearbox input shaft. Torque is transferred hydro-dynamically from impeller 26 to turbine 28 when the impeller 26 rotates faster than turbine 28. A bypass clutch 30 may be engaged to transfer torque by friction from the impeller 26 to the turbine 28 to reduce the power loss inherent in the hydro-dynamic power transfer. The gearbox 24 includes a number of hydraulically actuated shift elements. The gearbox 24 establishes different speed ratios by engaging various subsets of the shift elements. Pressurized fluid to engage the shift elements is provided by the transmission pump 32.

The transmission 14 includes a plurality of sensors (such as speed sensors, sump-temperature sensors, and shift-position sensors) and control logic used to optimize shift characteristics. But, most modern transmissions do not have a torque sensor. A torque sensor enables direct measurement of torque of a transmission shaft (such as the output shaft). Torque data of the shaft can be used by the transmission control unit to engage and disengage the clutches more effectively leading to smoother shifts and a better customer experience.

Figure 2:
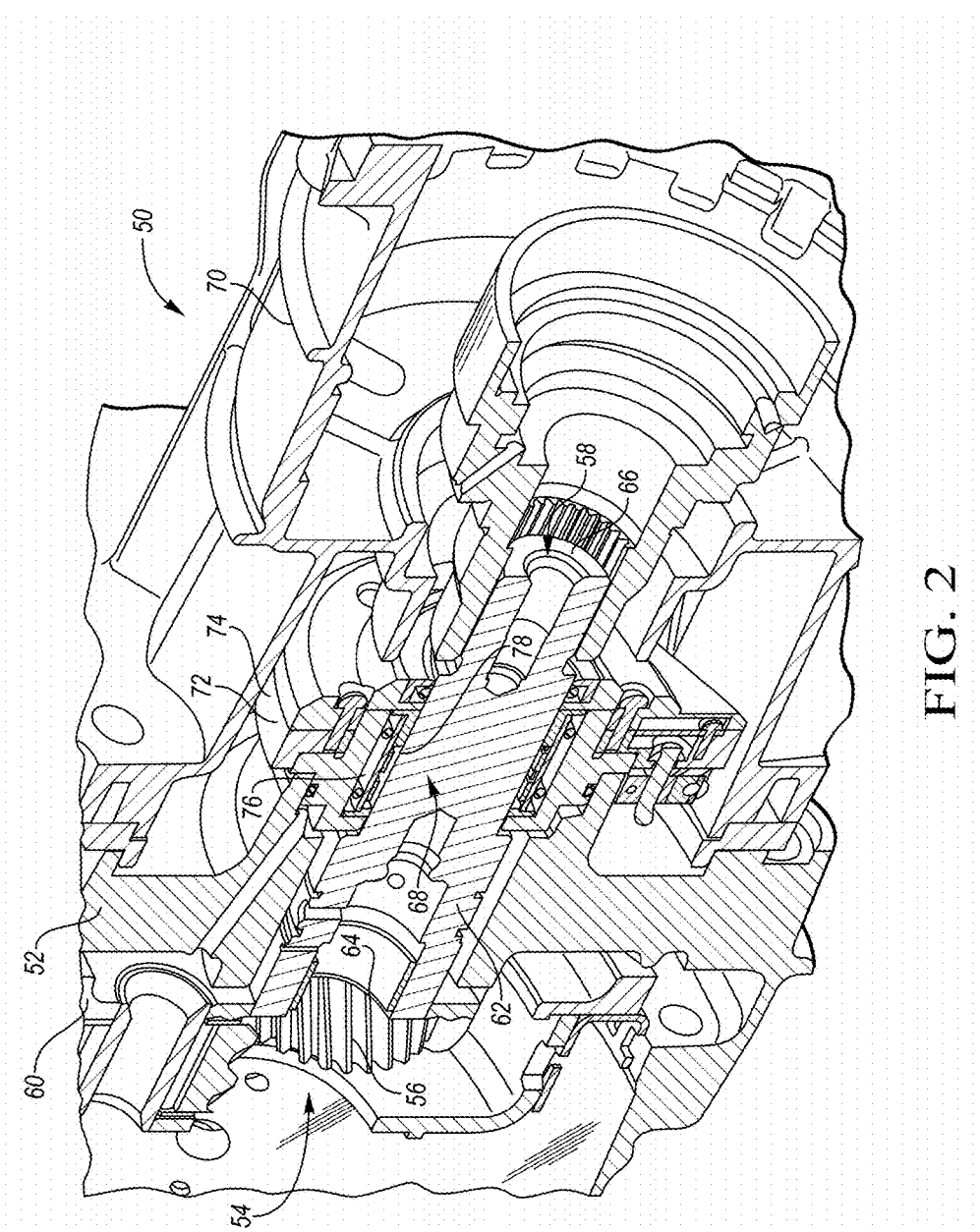
FIG. 2 is a perspective view, in cross section, of a rear portion of a transmission and a front portion of a transfer case.

Referring to FIG. 2, the transmission 50 includes a transmission case 52 that defines the transmission interior. At least one planetary gear set 54 is disposed within the transmission case 52 and is operably coupled between an input shaft and an output shaft to effectuate a gear ratio between the input and output shafts. The planetary gear set 54 may be one or more planetary sets arranged in series. Each planetary 54 may include a ring gear, a sun gear, a planet carrier, and a plurality of planet gears 56. The shaft of each the planet gears may be operably coupled with a carrier 60. The carrier 60 may include boreholes that receive the shaft of the planet gears. The carrier includes a park gear having teeth circumferentially arranged on an outside diameter of the gear. The teeth on the carrier 60 engage with a park pawl in order to lock the transmission 50 to prevent the vehicle for moving when parked. The carrier 60 defines an inner bore that receives a proximal end 64 of the shaft 62. The carrier 60 and the shaft 62 are fixed relative to each other forming a two-piece output shaft assembly 58. A portion of the shaft 62 extends through a port defined by the transmission case 52. The distal end 66 of the shaft 62 is connected with a driveline component. In the illustrated embodiment, the driveline component is a transfer case 70. In a two-wheel drive embodiment, the distal end 66 of the shaft is connected to a driveshaft.

The transmission 50 also includes a torque sensor 72 that measures the torque of the output shaft assembly 58. In some embodiments, the sensor 72 is a magnetic torque sensor for monitoring torque of the shaft 62. In other embodiments, the sensor 72 is a speed sensor for monitoring the speed of the shaft 62. Further, the torque sensor 72 may be a magnetic torque and speed sensor for monitoring both the speed and the torque of the output shaft 62.

The torque sensor 72 includes a housing 74 that defines a inner diameter (hole) 78. The torque sensor 72 is attached to the case 52 such that the shaft 62 extends through the hole 78. In the illustrated embodiment, the torque sensor 72 is bolted to the back of the transmission case 52. The torque sensor 72 includes one or more sensing elements 76 that are stationary relative to the rotating shaft 62. The sensing elements 76 may be magnetic-flux-sensing such as fluxgate sensors (these are also known as magnetoelsatic elements). The shaft 62 includes a sensor zone that is disposed within the inner diameter 78 of the sensor 72. The sensor zone is a smooth surface area on the shaft with a constant diameter and controlled hardness. The sensor zone is a magnetized region that extends circumferentially around the shaft 62. The shaft 62 may be made of steel having a high nickel content (such as 4340 steel alloy) preferably with a Martensite structure in order to magnetize the shaft. The shaft 62 is hardened to enable permanent magnetization. Rotation of the shaft 62 within the housing 74 creates a magnetic flux that is sensed by the sensor 72 in order to determine the speed and/or the torque of the shaft 62.

Typically, the output shaft assembly of a transmission is a one-piece component having the carrier and the shaft integrally formed. The output shaft is typically manufactured by machining a single stock into a carrier portion and a shaft portion. Because the outside diameter (OD) of the carrier is much larger (e.g. 7 inches) than the OD of the shaft, a large amount of material must be machined away from the shaft. In order for the torque sensor to function, at least a portion of the shaft must be magnetized. To accomplish this, the shaft is formed of a steel having a high nickel content (such as 4340 steel alloy).

Figure 5:
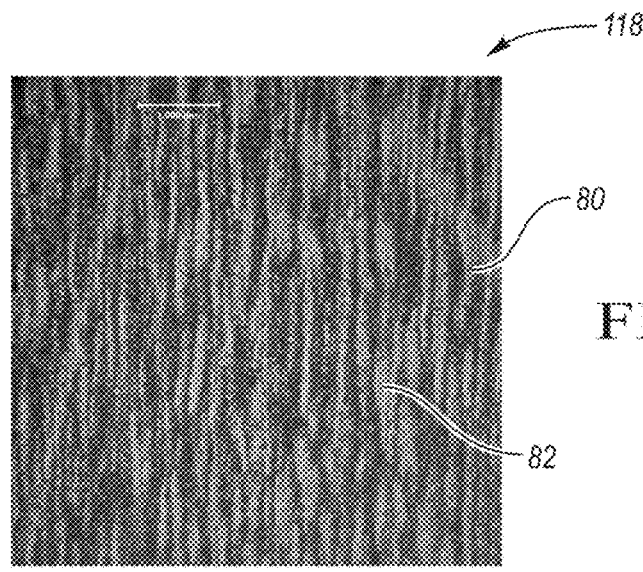
FIG. 5 is a magnified view of a transmission output shaft illustrating a microstructure with banding.

Referring to FIG. 5, testing and experimentation showed that machining a one-piece output shaft assembly out of steel having a high nickel content resulted in an unsatisfactory outer surface within the sensor zone 118 of the shaft. FIG. 5 illustrates a highly magnified picture of an outer surface 80 of a transmission output shaft. The picture illustrates that after machining a large portion of the stock to form a shaft, the finished outer surface 80 includes banding 82. Banding refers to zones of inconsistent alloy content. Banding creates inconsistent hardness, which results in poor torque sensor performance. The banding issue is much more prevalent towards the center of the stock than near the outer surface. The banding is an inherent limitation in the production process for forming alloy steels. Through testing and experimentation, it was determined that machining a shaft from a stock that more closely matched to the finished shaft OD resulted in significantly less banding and had an outer surface satisfactory for use with the torque sensor. For Example, machining a 2.375" OD stock to a 1.5625" OD finished shaft produced significantly less banding and suitable metal properties. But, because the carrier is much larger than the shaft, the carrier cannot be machined from the same stock as the shaft. Thus, this disclosure proposes a two-piece output shaft assembly for use with a transmission having a torque sensor.

Figure 3:
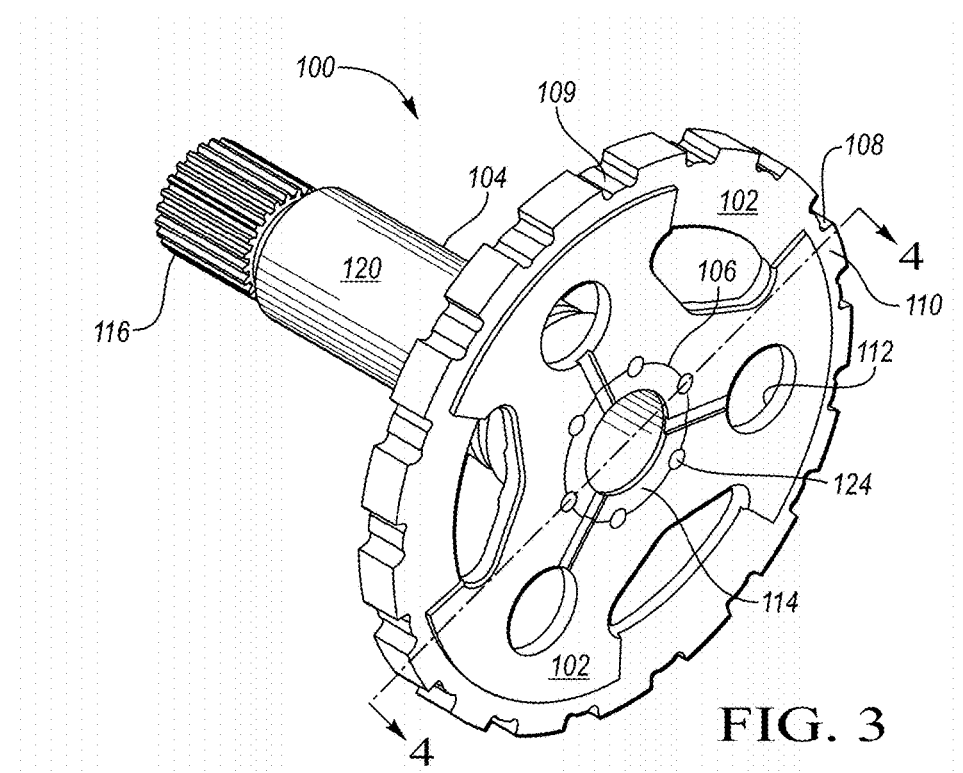
FIG. 3 is a perspective view of an example two-piece output shaft assembly.
Figure 4:
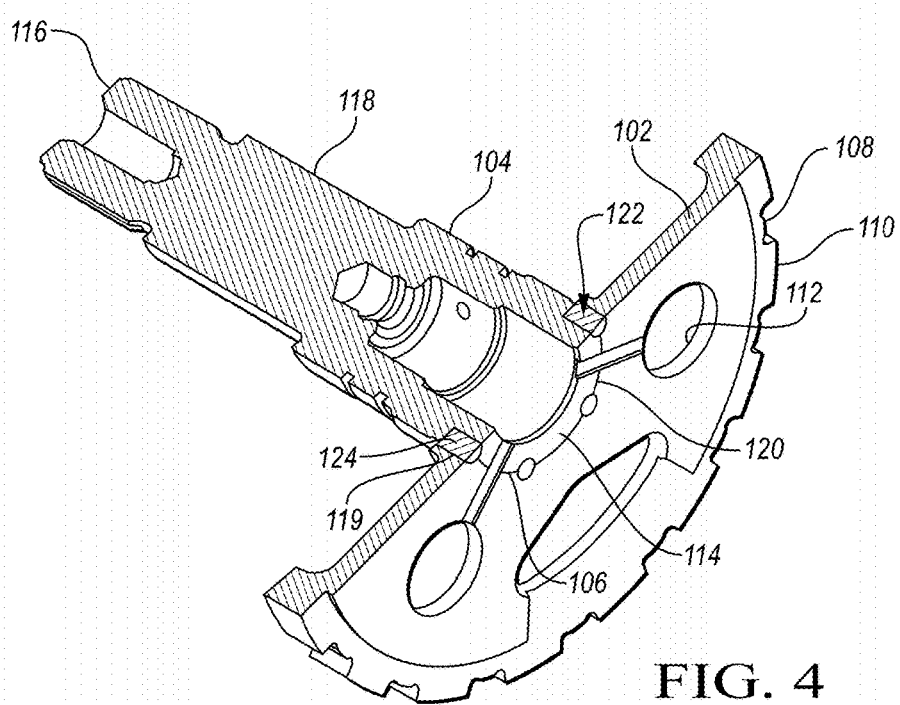
FIG. 4 is a perspective view, in cross section, of the output shaft along cut line 4-4.

Referring to FIGS. 3 and 4, an example two-piece output shaft assembly 100 includes a carrier 102 and a shaft 104. The carrier 102 defines an inner bore 106 and an OD 108. The OD 108 includes a park gear 109 having teeth 110 that engage with the park pawl of the transmission when the gear selector is in park. The carrier 102 also defines a plurality of holes 112 that each receive a shaft of one of the planetary gears. The shaft 104 includes a fixed end 114 that is received within the inner bore 106, and a free end 116 that is connectable to a driveline component, such as the transfer case or the driveshaft depending upon if the vehicle is two-wheel or four-wheel drive. The shaft 104 defines a sensor zone 118 that is disposed within a torque sensor when the shaft is installed on the transmission.

The carrier 102 and the shaft 104 may be fixed to each other via an interference fit between an outer surface 120 of the shaft 104 and the inner surface 119 of the inner bore 106. In order to strengthen the interference fit, the inner bore 106 and/or the shaft 104 may include features to increase the strength of the connection. In the illustrated embodiment, six pins 124 are inserted into the connection at the interface between the outer surface 120 and the inner surface 119. Other embodiments may include more or less pins depending upon the torque requirements of the transmission. The pins 124 are received in the bore holes 122 that are each partially defined by the cooperation of the carrier 102 and the shaft 104. The pins 124 may be interference fit into the bore holes 122. In some embodiments the pins 124 may also be welded to the assembly 100.

Figure 6:
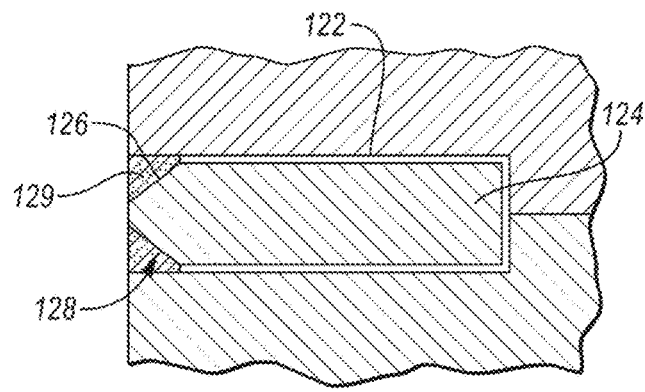
FIG. 6 is a side view, in cross-section, of a pin connection according to one embodiment.

Referring to FIG. 6, in one example embodiment, the pins 124 include a chamfered edge 126 that cooperates with the bore holes 122 to create pockets 128. The pockets provide an area for additional weld material 129, which prevents axial movement of the pins.

Referring back to FIGS. 4 and 5, the carrier 102 and the shaft 104 are separate components machined from two different stocks. As explained above, machining the shaft from a stock large enough to be the carrier gear yielded unsatisfactory torque sensor performance. For example, the carrier 102 may be machined from a 7.5 inch stock and the shaft may be machined from a 2.5 inch stock. The carrier 102 and the shaft 104 may be made from different materials. The shaft 104 requires a magnetizable steel (such as alloys having a high nickel content) whereas the carrier gear may be made out of any type of high-strength steel. In one embodiment, the carrier 102 is made from 1050 steel alloy and the shaft 104 is made from 4340 steel alloy, which is well suited for creating a permanent magnet.

Figure 7:
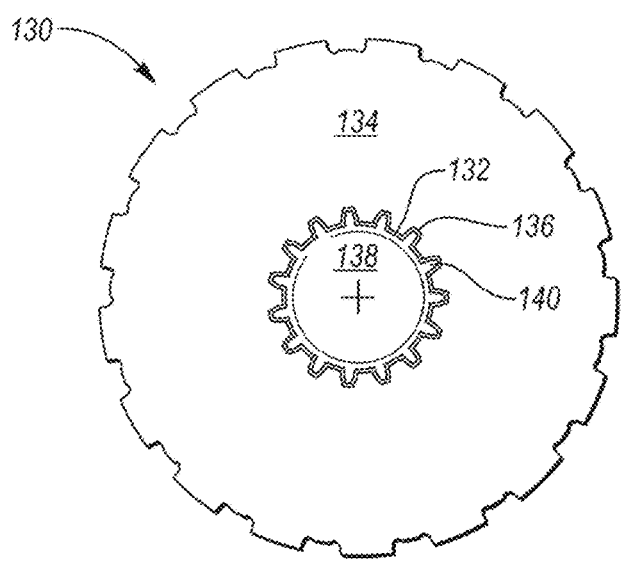
FIG. 7 is a front view of another example two-piece output shaft assembly having a splined interference fit.

FIG. 7 illustrates another two-piece output shaft assembly 130. The assembly 130 is similar to the embodiment shown in FIG. 4 except that it includes a splined interference fit. The inner bore 132 of the carrier gear 134 defines a plurality of grooves 136. A portion of the shaft 138 defines a plurality of splines 140. The splines 140 are received within the grooves 136 when the shaft 138 is installed into the inner bore 132. The splines and grooves cooperate to increase the strength of the connection.

Figure 8:
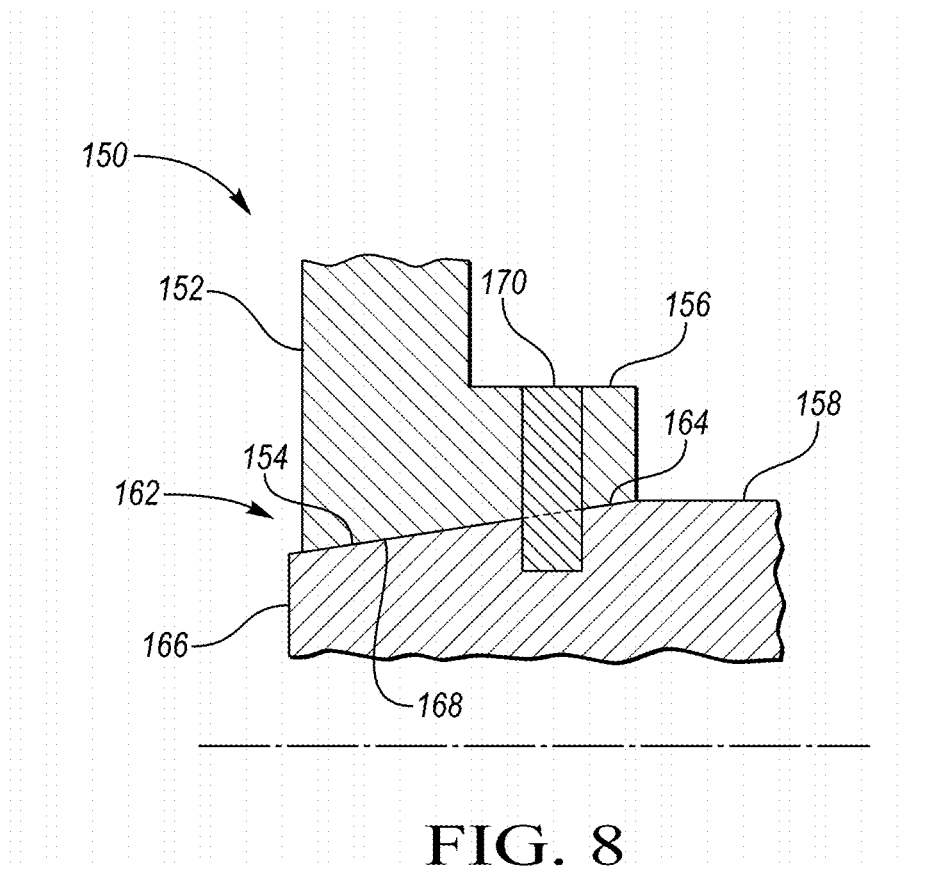
FIG. 8 is a side view, in cross section, of yet another example two-piece output shaft assembly having a tapered interference fit.

FIG. 8 illustrates a portion of yet another two-piece output shaft assembly 150. The assembly includes a carrier 152 defining an inner bore 154 and a shoulder 156. The assembly also includes a shaft 158 defining an OD. The inner bore 154 of the carrier 152 is designed to receive one end of the shaft 158. The carrier and shaft may be assembled together by a tapered interference fit 162. In the illustrated embodiment, the inner bore 154 defines an angled surface 164 that extends from the shoulder 156 to an outer side of the carrier 152. The shaft 158 defines a tapered (e.g. frustoconical) portion 166 that is received within the bore 154 and engages with the angled surface 164. The angled surface 164 and the tapered portion 166 are sized such that the shaft 158 must be press-fit into the carrier. The forces at the shaft-carrier interface 168 are sufficient to transfer torque from the carrier to the shaft without slip between the shaft and carrier. A pin 170 may be disposed in the shoulder 156 and the shaft 158 to prevent the carrier 152 from moving relative to the shaft 158.

In other embodiments, the inner bore of the carrier could be square and a portion of the outer surface of the shaft could be square in order to increase the strength of the connection. Alternatively, the connection between the shaft in the gear could be keyed.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
a case;
a torque sensor attached to the case and defining an inner diameter; and
a two-piece output shaft assembly partially disposed within the case and including:
a planet carrier formed of a first material, and defining an inner bore and a park gear,
a shaft formed of a second material that is different than the first material and that has magnetic properties that cooperate with the torque sensor to sense a torque of the shaft, the shaft including a torque sensing zone extending through the inner diameter of the torque sensor and an end portion received in the inner bore, the end portion defining an outer surface sized such that an interference fit is created between the inner bore and the shaft, wherein the carrier and the shaft cooperate to define at least one bore hole with the carrier defining a first portion of the bore hole and the shaft defining a second portion of the bore hole,
a pin received within the bore hole to prevent relative movement between the carrier and the shaft, wherein the pin has a head that is chamfered creating a pocket defined between the pin and a sidewall of the bore hole, and wherein the pin is welded to the carrier and the shaft such that weld material is disposed in the pocket.

2. The transmission of claim 1 wherein the shaft is 4340 steel alloy.

3. A transmission two-piece output shaft assembly comprising:
a planet carrier formed of a first material, and defining an inner bore and a park gear; and
an output shaft formed of a second material that is different than the first material and that has magnetic properties configured to cooperate with a torque sensor to sense a torque of the shaft, the shaft including an end portion received in the inner bore and defining an outer surface sized such that an interference fit is created between the inner bore and the shaft, wherein the carrier and the shaft cooperate to define at least one bore hole with the carrier defining a first portion of the bore hole and the shaft defining a second portion of the bore hole; and
a pin received within the bore hole to prevent relative movement between the carrier and the shaft, wherein the pin has a head that is chamfered creating a pocket defined between the pin and a sidewall of the bore hole, and wherein the pin is welded to the carrier and the shaft such that weld material is disposed in the pocket.

4. The assembly of claim 3 wherein the shaft further includes a torque sensing zone configured to be received within a torque sensor connected to the transmission.

5. The assembly of claim 3 wherein the shaft is 4340 steel alloy.

6. A method of assembling a transmission comprising:
providing a transmission case;
machining a first stock billet having a first diameter to form a planet carrier that defines an inner bore and a park gear;
machining a second stock billet to form an output shaft having an outer surface, wherein the second stock billet has a second diameter that is smaller than the first diameter and is made of an alloy having magnetic properties configured to cooperate with a torque sensor;

inserting a first end of the output shaft into the inner bore such that an interference fit is formed between the inner bore and the outer surface to create a two-piece output shaft;
installing the two-piece output shaft in the case; and
receiving the shaft through an inner diameter defined by the torque sensor that is connected to the transmission.

7. The method of claim 6 further comprising installing at least one planetary gear in a bore defined by the carrier.

8. The method of claim 6 wherein the carrier and the shaft are made of different metal alloys.

9. The method of claim 6 wherein the shaft is 4340 steel alloy.

\* \* \* \* \*